United States Patent

Muraoka

[11] Patent Number: 5,979,608
[45] Date of Patent: Nov. 9, 1999

[54] REINFORCED BOOSTER FOR BICYCLE BRAKE

[75] Inventor: Tsutomu Muraoka, Sakai, Japan

[73] Assignee: Shimano Inc., Osaka, Japan

[21] Appl. No.: 08/883,316

[22] Filed: Jun. 26, 1997

[51] Int. Cl.$^6$ ....................................................... B62L 1/06
[52] U.S. Cl. ....................................................... 188/24.14
[58] Field of Search ............................ 188/24.11, 24.12, 188/24.14, 24.21, 24.22; 156/245, 242

[56] References Cited

U.S. PATENT DOCUMENTS

| | | | |
|---|---|---|---|
| 4,983,433 | 1/1991 | Shirasaki | 422/36.1 |
| 5,499,699 | 3/1996 | Chen | 188/24.21 |
| 5,531,296 | 7/1996 | Liu | 188/24.21 |
| 5,624,519 | 4/1997 | Nelson et al. | 156/245 |
| 5,626,355 | 5/1997 | Voss et al. | 280/276 |
| 5,636,716 | 6/1997 | Sugimoto et al. | 188/24.22 |

FOREIGN PATENT DOCUMENTS

29705200  6/1997  Germany .

*Primary Examiner*—Robert J. Oberleitner
*Assistant Examiner*—Melanie Talavera
*Attorney, Agent, or Firm*—Shinjyu Global IP Counselors, LLP

[57] ABSTRACT

A reinforced booster for a bicycle brake is substantially U-shaped and attached to the pivot points of the bicycle brake to increase its braking power. The reinforced booster has a substantially U-shaped member with inner and outer peripheral edges which have high strength strands of fiber attached thereto for increasing the strength of the U-shaped member. The strands of fibers extend longitudinally along the peripheral edges of the U-shaped member. Preferably, the U-shaped member is constructed of a plurality of sheets of a non-metallic material. For example, a plurality of carbon sheets can be used to form the U-shaped member. The strands of fibers attached to the peripheral edges of the U-shaped member can be, for example, carbon fibers, polyamide fibers, glass fibers or other reinforced plastic fibers. The free ends of the booster has mounting holes which are preferably formed by strands of fibers.

41 Claims, 6 Drawing Sheets

REINFORCED BOOSTER FOR BICYCLE BRAKE

BACKGROUND OF THE INVENTION

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One particular component of bicycles which have been extensively redesigned over the past years is the bicycle brake device. Bicycle brake devices are constantly being redesigned to be lighter and to provide additional braking power.

There are several types of bicycle brake devices which are currently available on the market. Examples of some types of common bicycle brake devices include rim brakes and caliper brakes. With respect to caliper brakes, there are mainly three types of caliper brakes: a side pull type, a center pull type and a cantilever type. In a side pull type of caliper brake device, a pair of brake arms are pivotally connected together about a center mounting bolt which attaches to the frame of the bicycle. Each of the brake arms has a lever portion which is coupled to the brake wire such that when the rider operates the brake lever of the brake operating device, the lever portions of the brake arms are pulled together, which in turn moves the brake shoes attached to the other end of the brake arms together against the rim of the bicycle wheel. A return spring is provided for biasing the brake arms away from the bicycle wheel rim when the rider releases the brake lever. Side pull types of caliper brake devices are commonly used in road bikes.

A center pull type of caliper brake device operates similar to the side pull type, except that the brake arms are attached to a brake arm bridge such that each brake arm is pivotally coupled at a separate pivot point on the brake arm bridge. The brake arm bridge is attached directly to the frame of the bicycle. A straddle cable interconnects the two lever portions of the brake arms such that a main brake wire is coupled to the straddle wire for pulling the lever portions of the brake arms together.

A cantilever type of brake device is generally mounted on bicycles which are designed for off-road use such as mountain bikes (MTB) and all terrain bikes (ATB). In particular, a cantilever type brake device is designed to provide a more powerful braking force. A cantilever type brake device is equipped with a pair of brake arms which are rotatably supported in a cantilever fashion on the front or rear fork of the bicycle frame, with the brake shoes attached to an upper portion of the brake arms. Typically, the lower end of the brake arms are rotatably supported on the brake frame and the upper end is linked to a brake cable or wire. The brake shoes are arranged opposite one another on either side of the bicycle wheel rim which is located between the arms. With this cantilever type of brake device, the bicycle arms rotate in the closing direction when the brake cable is pulled by the brake lever, which in turn results in the brake shoes being pressed against the rim of the bicycle wheel to apply a braking force.

Cantilever types of brake devices have several advantages over side pull types of caliper brake devices. For example, with such a cantilever brake device, there is no need to vary the shape of the brake device with the size of the bicycle as may be the case with a side pull type caliper brake device. Moreover, cantilever type of brake devices apply a more equal braking force than a side pull type caliper brake.

To further increase the braking force applied to the wheel rim, U-shaped boosters have been designed for attaching to cantilever type of brake devices for increasing the structural rigidity of brake devices. In particular, the booster is typically a U-shaped member having its lower free ends attached to the pivot points of each of the brake arms. Accordingly, the booster reduces the amount of outward deflection of the brake arms when a braking force is applied by the brake shoes against the bicycle wheel rim. There are currently several different types of boosters that are available on the market. Typically, the U-shaped booster is constructed out of a lightweight metallic material such as aluminum. More recently, boosters have been constructed from carbon fiber composite materials. However, the boosters constructed of carbon fiber composite materials are typically expensive to manufacture and therefore has not gained a lot of popularity.

In view of the above, there exists a need for a booster which increases the stiffness of a brake device and which is lightweight. This invention addresses this need in the art as well as other needs in the art which will become apparent to those skilled in the art from this disclosure.

SUMMARY OF THE INVENTION

One of the objects of the present invention is to provide a reinforced booster which attaches to a brake device to increase its rigidity, and thus, increase the braking force of the brake device.

Another object of the present invention is to provide a strong yet lightweight booster constructed of strands of high strength fibers.

Still another object of the present invention is to provide a reinforced booster which is relatively inexpensive to manufacture.

Yet another object of the present invention is to provide a reinforced booster which has improved structural rigidity.

The foregoing objects can basically be attained by providing a reinforced booster for a bicycle brake, comprising a center section; a first leg section integrally formed with the center section and having a free end with a first mounting hole formed therein; and a second leg section integrally formed with the center section and extending therefrom to a free end with a second mounting hole formed therein, the center section, the first leg section and the second leg section being formed by a substantially U-shaped member having first and second ends with inner and outer peripheral edges extending therebetween, and first strands of fibers coupled to the U-shaped member to extend longitudinally along one of the peripheral edges of the U-shaped member.

It will be apparent to those skilled in the art from this disclosure that the reinforced booster in accordance with the present invention should not be limited to cantilever type brake devices as shown herein. Rather, the reinforced booster in accordance with the present invention can be utilized with other types of brake devices and the like. Moreover, the reinforced booster can be coupled to either the front or back brakes as needed and/or desired.

Other objects, advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form part of this original disclosure.

DETAILED DESCRIPTION OF THE PREFERRED EMBODIMENT

Figure 1:
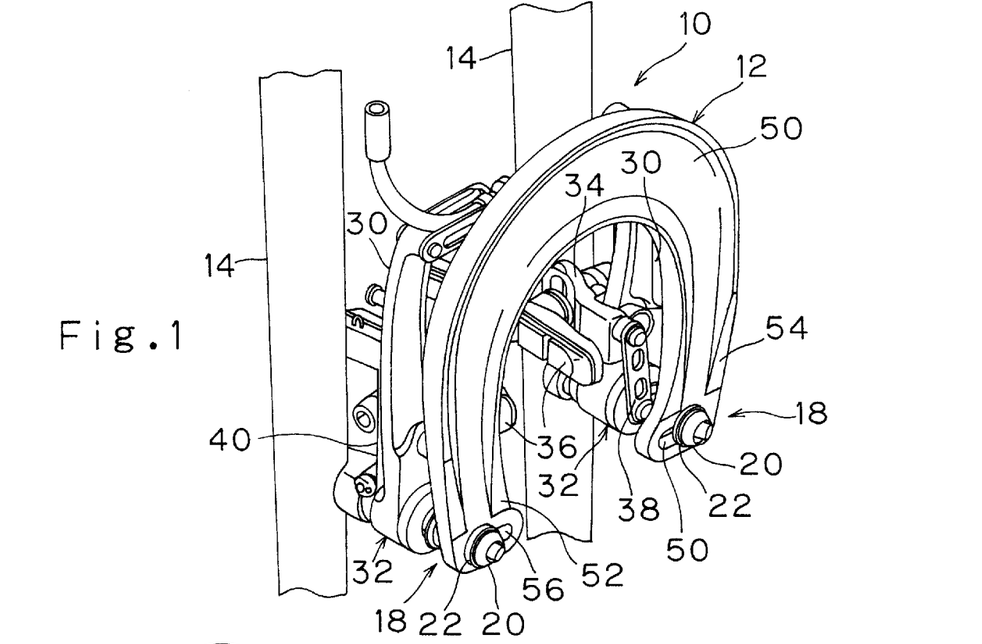
FIG. 1 is a side perspective view of a brake device with a reinforced booster in accordance with the present invention coupled thereto.
Figure 2:
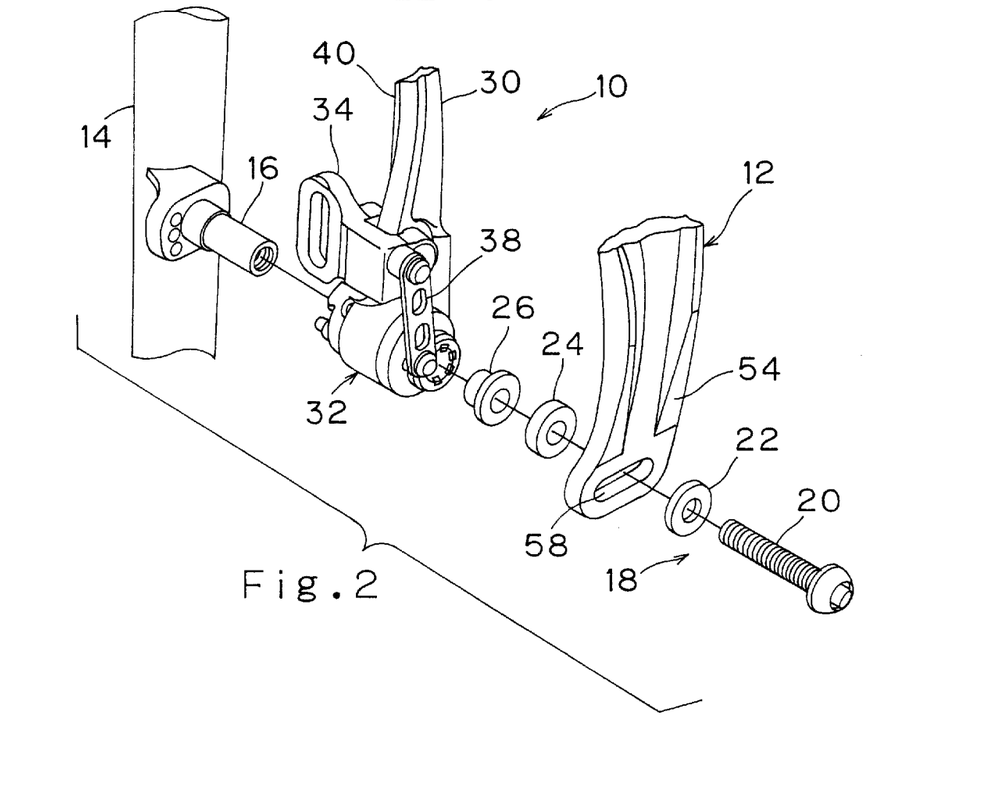
FIG. 2 is an exploded partial perspective view of the brake device and reinforced booster illustrated in FIG. 1, illustrating the mounting of the reinforced booster to the brake device.
Figure 3:
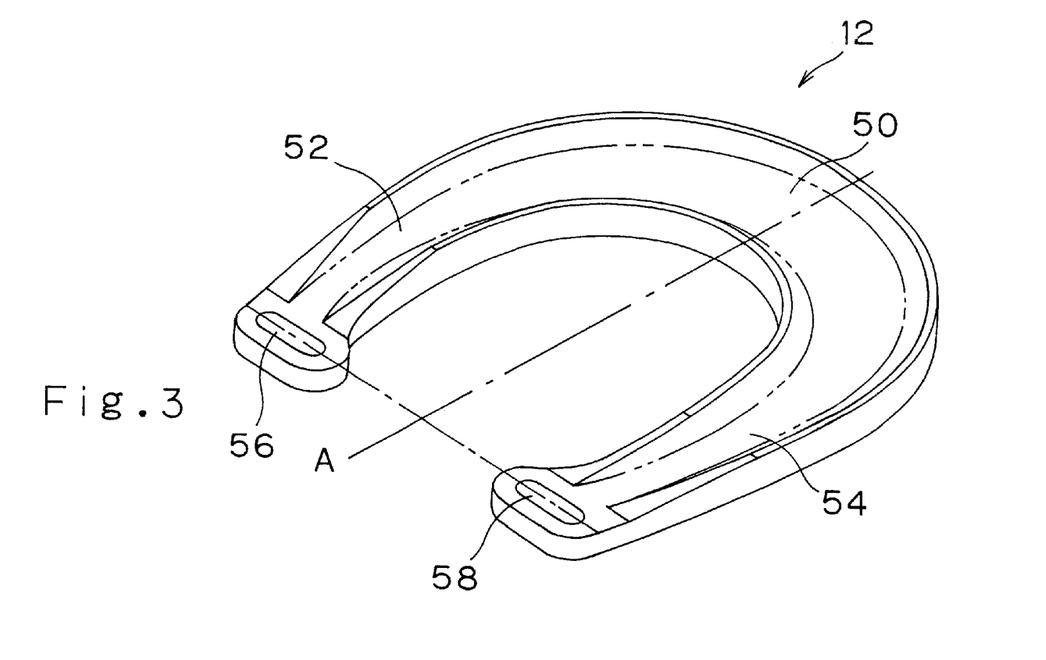
FIG. 3 is a front perspective view of the reinforced booster illustrated in FIGS. 1 and 2 in accordance with the present invention.
Figure 4:
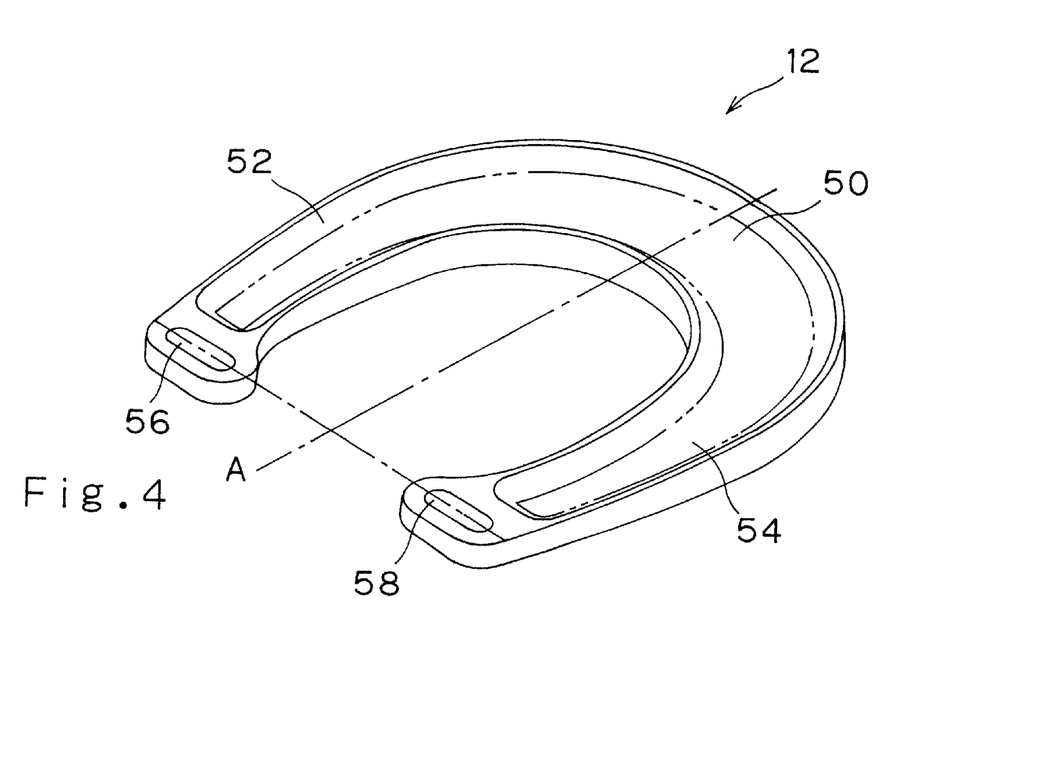
FIG. 4 is a rear perspective view of the reinforced booster illustrated in FIGS. 1–3 in accordance with the present invention.

Referring initially to FIGS. 1 and 2, a brake device 10 is illustrated with a reinforced booster 12 fixedly coupled thereto in accordance with the present invention. Reinforced booster 12 is constructed of a plurality of strands of high strength fibers such that booster 12 is strong, yet lightweight. For example, the strands of high strength fibers can be carbon fibers, polyamide fibers, glass fibers or plastic fibers. Preferably, a carbon fiber composite material is utilized to construct booster 12. Booster 12 has a generally U-shaped configuration which is inverted when coupled to brake device 10.

Brake device 10 as illustrated in FIGS. 1 and 2 is a cantilever type brake device which is similar to the brake device disclosed in U.S. Pat. No. 5,636,716 to Sugimoto et al., of which the entire disclosure is hereby incorporated herein by reference. It will be apparent to those skilled in the art from this disclosure that other types of brake devices can be utilized in conjunction with booster 12 constructed in accordance with the present invention. Since brake devices are well known in the art, brake device 10 will not be discussed and/or illustrated in detail herein.

Basically, brake device 10 is designed for engaging and applying a braking force against a rim of a bicycle wheel (not shown) which is coupled to the fork 14 of the bicycle (not shown). Brake device 10 is mounted on mounting posts or stems 16 of fork 14 together with booster 12. More specifically, brake device 10 and booster 12 are coupled to mounting posts 16 via a pair of fastening assemblies 18 (only one shown). Each of the fastening assemblies 18 includes a set bolt 20, a washer 22, an optional spacer 24 and a bushing 26. When certain cantilever brake devices are used, spacer 24 may not be necessary. Moreover, the use of bushing 26, washer 22 and spacer 24 will depend on the particular brake device in which booster 12 is being coupled thereto.

Brake device 10 will now be briefly described to understand its relationship to booster 12. Brake device 10 basically includes a pair of brake arms 30 with their lower portions pivotally coupled to mounting posts 16 via base assemblies 32 which are fixedly coupled to mounting posts 16. Accordingly, brake arms 30 can rotate about base assemblies 32 and mounting posts 16. The upper ends of brake arms 30 are coupled together by a brake cable (not shown) which in turn is coupled to a brake operating device (not shown) for rotating brake arms 30 about mounting posts 16 and base assemblies 32.

A pair of brake shoe attachment portions 34 are coupled to the upper portions of brake arms 30. Brake attachment portions 34 have brake shoes 36 coupled thereto for engaging a bicycle rim of a bicycle wheel. In the brake device 10 which is illustrated herein, brake attachment portions 34 are pivotally coupled to the upper portions of brake arms 30. Brake attachment portions 34 are further coupled to base assemblies 32 via links 38 such that brake shoes 36 move in a substantially linear direction when brake arms 30 are pivoted together such that the brake pads of the brake shoes 36 engage the bicycle rim. A return spring 40 in the form of a wire leaf spring is utilized on each of the brake arms 30 for returning brake arms 30 to their outermost positions upon release of the brake operating device. Of course, as mentioned above, other types of brake devices can be utilized with booster 12 in accordance with the present invention.

Turning now to the construction of booster 12, as seen in FIGS. 3, 4, 11 and 12, in its preferred form, booster 12 is preferably constructed of non-metallic materials. However, metallic portions may be used as needed and/or desired. Booster 12 is substantially U-shaped, and has a center section 50 with first and second leg sections 52 and 54 extending downwardly from center section 50 to free ends. The free ends of first and second leg sections 52 and 54 are provided with first and second mounting holes 56 and 58 which receive set bolts 20 for attaching booster 12 to brake device 10 which in turn is attached to fork 14 via mounting post 16.

Booster 12 in its final form is a one-piece, unitary member with center section 50 integrally formed with first and second leg sections 52 and 54. When booster 12 is attached to brake device 10, its main axis of symmetry A is preferably aligned with the center plane of rotation of the bicycle wheel such that booster 12 does not interfere with or hit the tire of the bicycle. While center section 50 is illustrated as being curved, it will be apparent to those skilled in the art from this disclosure that center section 50 can have other shapes as needed and/or desired.

Figure 5:
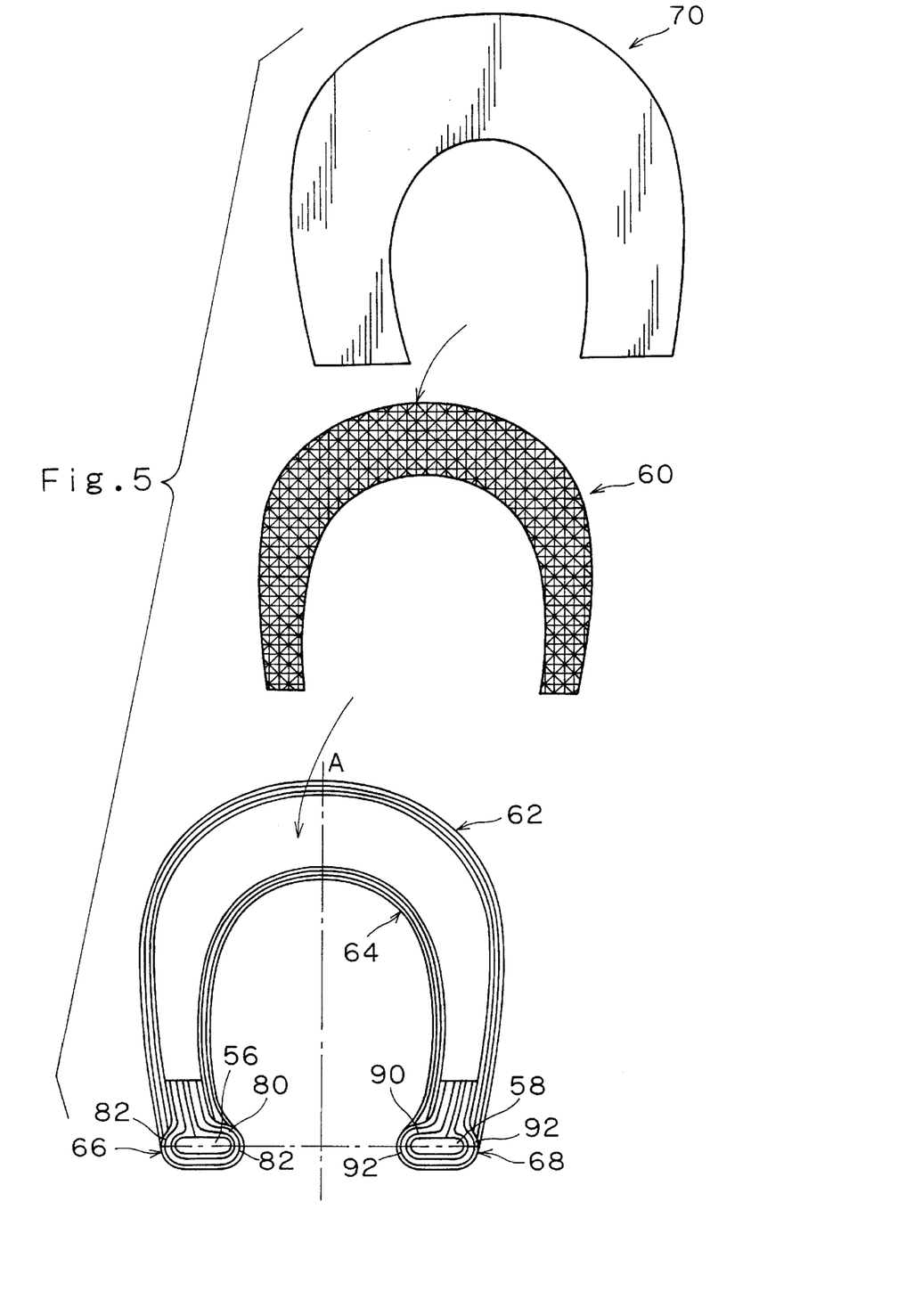
FIG. 5 is an exploded perspective view showing the various high strength strands of fibers utilized to construct the reinforced booster illustrated in FIGS. 1–4 in accordance with the present invention.
Figure 6:
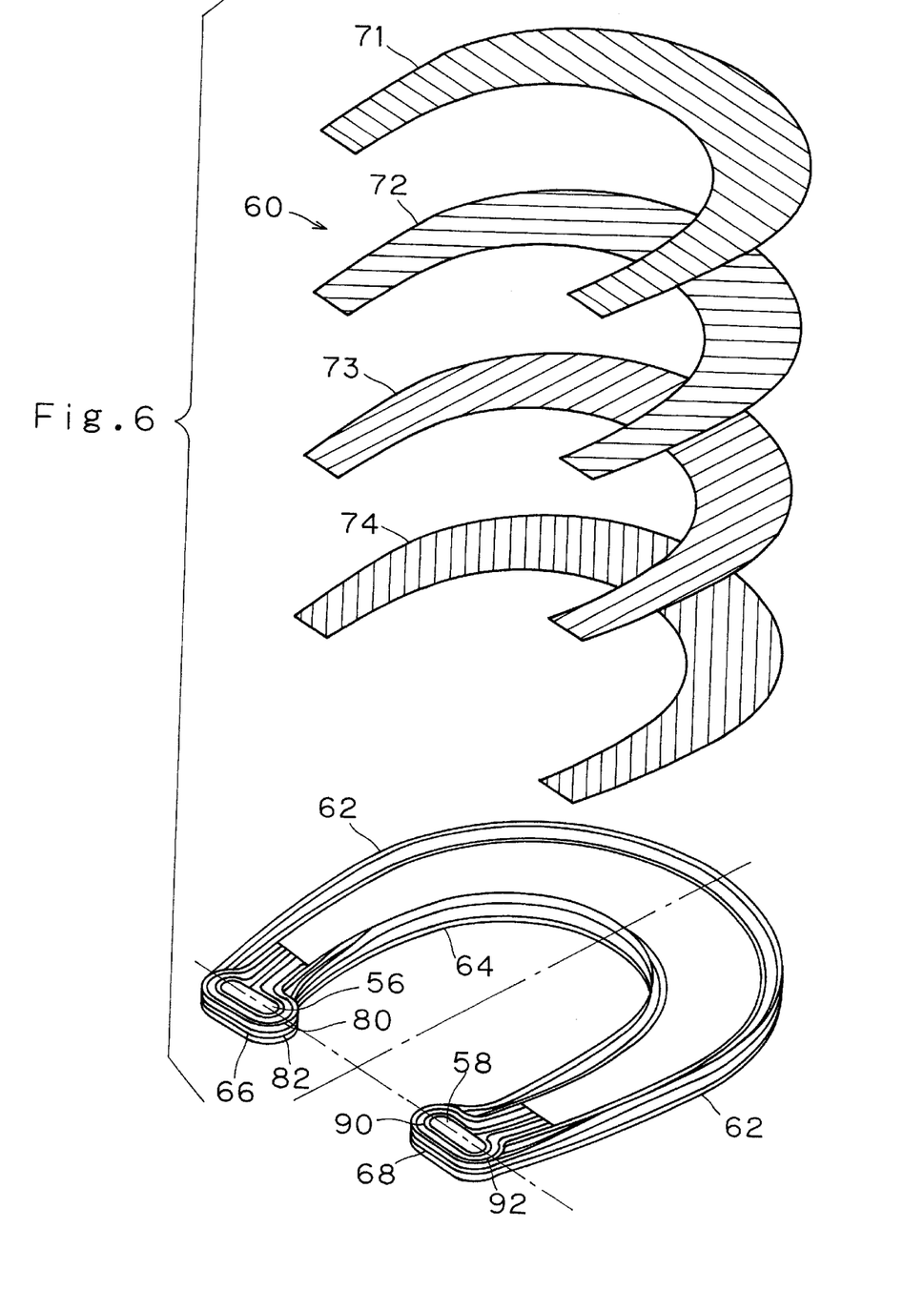
FIG. 6 is a further exploded elevational view of the construction of the reinforced booster illustrated in FIGS. 1–5.
Figure 13:
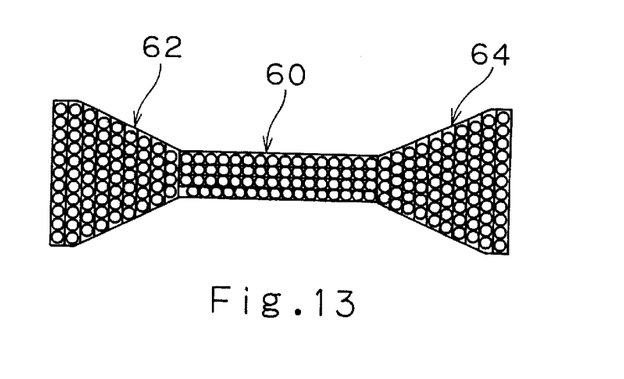
FIG. 13 is a partial cross-sectional view of the reinforced booster illustrated in FIGS. 1–5 and 11, taken along section line 13—13 of FIG. 11.

As seen in FIGS. 5, 6, and 13, carbon booster 12 is preferably constructed from a U-shaped member 60, a plurality of outer strands of fibers 62, a plurality of inner strands of fibers 64, a first set of end strands of fibers 66 and a second set of end strands of fibers 68. These strands of fibers 62, 64, 66 and 68 are preferably coupled together with the U-shaped member 60 via an epoxy resin. Moreover, as seen in FIG. 5, a decorative sheet 70 can be utilized to cover the front surface of booster 12 to provide ornamentation and/or the desired appearance of booster 12. In particular, decorative sheet 70 can have a decorative pattern and/or indicia informed thereon to provide information to the end user.

U-shaped member 60 is preferably constructed from a plurality of reinforced fiber sheets. For example, as seen in FIGS. 6–10, U-shaped member 60 is constructed of four or more reinforced fiber sheets 71–74, of which only four are illustrated herein, but of course, more fiber sheets can be used. Preferably, these reinforced fiber sheets 71–74 are constructed of uni-directional fibers such that each of the adjacent sheets 71–74 has its reinforced fibers extending in a different direction from the reinforced fibers of the adjacent sheet. By changing the directions of the fibers in each of the sheets 71–74, the strength of the U-shaped member 60 is capable of handling forces in a wide variety of directions. In particular, reinforced fibers are typically very strong in either tension or compression, but are typically weak when the force is applied in a direction substantially transverse to the longitudinal axis of the strands. Thus, by crisscrossing the strands as seen in FIG. 5, the composite U-shaped member 60 has an increased strength over a U-shaped member in which all of the strands run in one direction. Of course, it will be apparent to those skilled in the art that U-shaped member 60 could be constructed of a single molded plastic member, sheet aluminum, a polyamide, a fiber reinforced plastic, etc.

Figure 7:
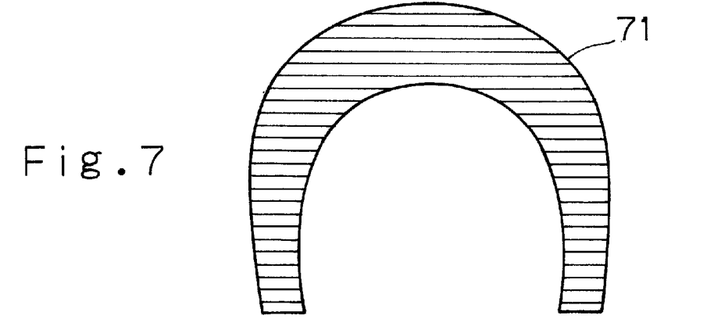
FIG. 7 is a front elevational view of a first sheet of reinforced fibers utilized in the construction of the reinforced booster illustrated in FIGS. 1–6 with the strands of fibers of the first sheet running substantially 90° with respect to its main axis of symmetry.
Figure 8:
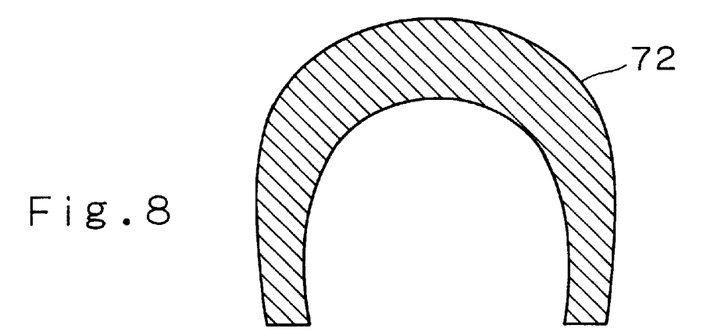
FIG. 8 is a front elevational view of a second sheet of reinforced fibers utilized in the construction of the reinforced booster illustrated in FIGS. 1–6, with the strands of fibers of the second sheet running at a substantially 45° angle relative to the main axis of symmetry.
Figure 9:
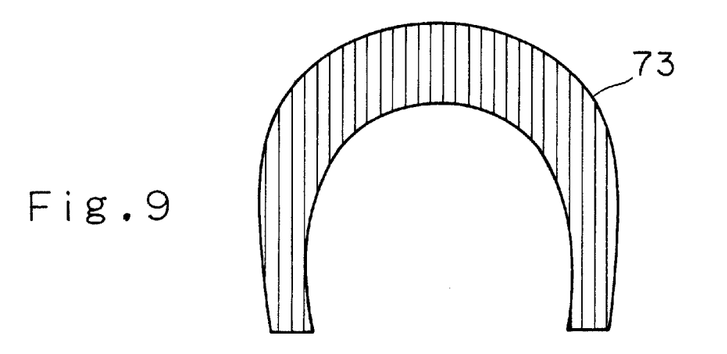
FIG. 9 is a front elevational view of a third sheet of reinforced fibers utilized in the construction of the reinforced booster illustrated in FIGS. 1–6, with the strands of fibers of the third sheet running substantially parallel to the main axis of symmetry.
Figure 10:
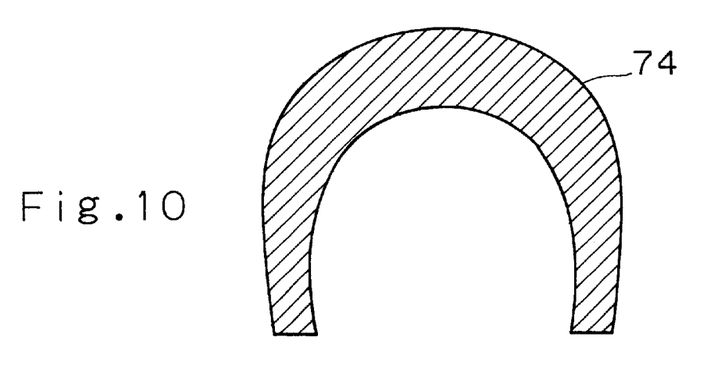
FIG. 10 is a front elevational view of a fourth sheet of reinforced fibers utilized in the construction of the reinforced booster illustrated in FIGS. 1–6, with the strands of fibers of the fourth sheet running at a substantially 45° angle with respect to the main axis of symmetry.
Figure 11:
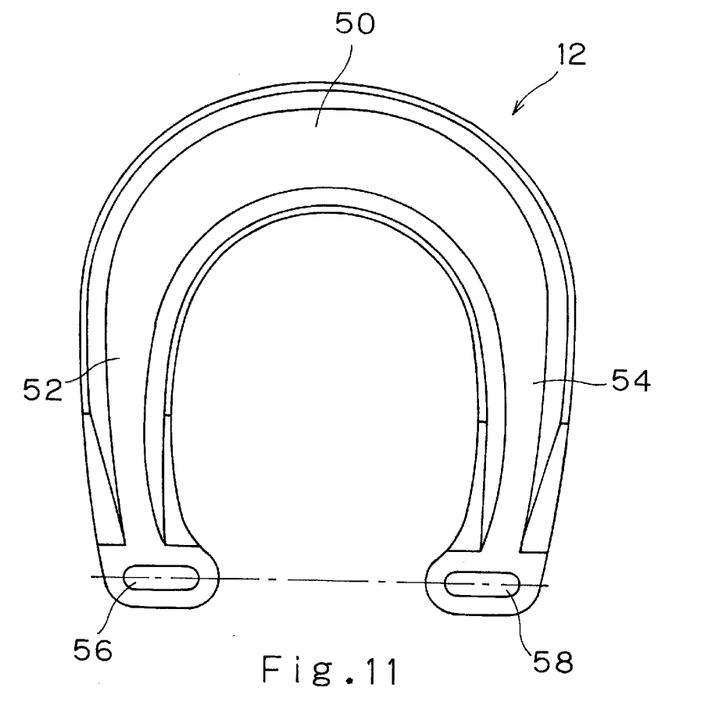
FIG. 11 is a front elevational view of the final construction of the reinforced booster in accordance with the present invention.
Figure 12:
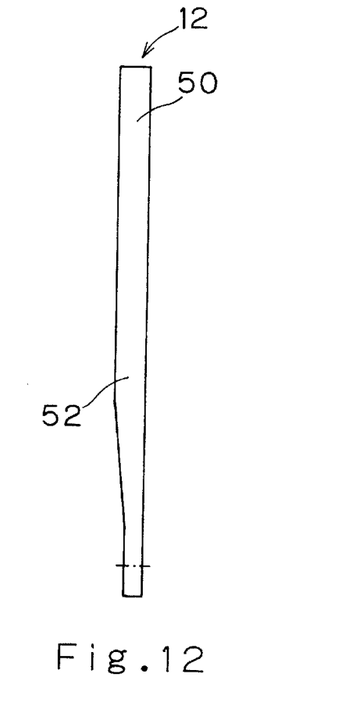
FIG. 12 is a side elevational view of the reinforced booster illustrated in FIG. 11.

In the preferred embodiment as seen in FIGS. 6–10, reinforced fiber sheets 71–74 are sheets constructed of uni-directional carbon fibers in which the strands of the fibers of each of the adjacent reinforced fiber sheets 71–74 are arranged approximately 45° relative to the adjacent sheet or sheets 71–74. In particular, as seen in FIG. 7, first sheet 71 of reinforced fibers has its strands of fibers running substantially 90° with respect to its main axis of symmetry A. Next, as seen in FIG. 8, second sheet 72 of reinforced fibers has its strands of fibers running at a substantially 45° angle relative to the main axis of symmetry A. Third sheet 73 of reinforced fibers as seen in FIG. 9, has its strands of fibers running substantially parallel to the main axis of symmetry; Finally, as seen in FIG. 10, fourth sheet 74 of reinforced fibers has its strands of fibers running at a substantially 45° angle with respect to the main axis of symmetry.

In constructing carbon fiber sheets 71–74, preferably the same type of carbon fiber sheets are utilized, except that the U-shaped portions are stamped out at different angles relative to the direction of the carbon fibers running in the sheet material utilized to construct sheets 71–74. It will be apparent to those skilled in the art from this disclosure that the carbon fibers of sheets 71–74 can extend at other angles than 45° relative to each adjacent sheet. For example, the sheets can be arranged to form a 60° angle between adjacent sheets.

Preferably, the reinforced fiber sheets 71–74 are approximately 0.21 millimeters in thickness. Each of the sheets 71–74 is preferably impregnated or coated with approximately 33% epoxy resin such that the sheets 71–74 adhere together upon being heated and compressed in a mold. Preferably, fiber sheets 71–74 are heated to approximately 150° C. and compressed to couple sheets 71–74 together and to strands of fibers 62, 64, 66 and 68.

As best seen in FIGS. 5 and 6, outer strands of fibers 62 extend about the outer peripheral or circumferential edge of U-shaped member 60 such that the outer strands of fibers 62 have their longitudinal axis running substantially circumferentially about the peripheral or circumferential outer edge of U-shaped member 60. As mentioned above, fibers are very strong in the axial direction but very weak when a force is applied transverse to the axial direction of the fibers. Accordingly, by running the outer strands of fibers 62 along the outer peripheral or circumferential edge of U-shaped member 60, the overall strength of U-shaped member 60 can be increased. Thus, the overall strength of booster 12 is increased by running outer strands of fibers 62 along its peripheral or circumferential edge.

In the preferred embodiment, outer strands of fibers 62 are formed from sheets of reinforced fibers, e.g., carbon fibers which arc similar to sheets 71–74 discussed above. In other words, a sheet material of reinforced fibers can be cut to the desired shape and length so as to be attached to the peripheral edge of U-shaped member 60. Preferably, outer strands of fibers 62 extend continuously along the outer peripheral edge of U-shaped member 60 and passed its free ends such that it overlaps the end strands of fibers 66 and 68.

In constructing booster 12, it will be apparent to those skilled in the art from this disclosure that some or all of the outer strands of fibers 62 can overlap the peripheral edge of U-shaped member 60 or all of the strands of fibers 62 can be positioned substantially outside but abutting against the outer peripheral edge of U-shaped member 60. In the preferred embodiment, the U-shaped member 60 abuts the outer strands of fibers 62 and then during the bonding process in which the outer strands of fibers 62 and the reinforced fiber sheets 71–74 are heated and pressed together, the outer strands of fibers 62 and the fibers of sheets 71–74 tend to slightly overlap.

Preferably, the outer strands of fibers 62 are constructed of circumferential layers of reinforced fiber sheets which extend substantially perpendicular to the reinforced fiber sheets 71–74 as diagrammatically illustrated in FIGS. 5, 6 and 13. In the preferred embodiment, the outer strands of fibers 62 are constructed of sixteen circumferential layers of reinforced fiber sheets. As seen in FIG. 13, the reinforced fiber sheets used to construct outer strands of fibers 62 have a width which is greater than the total thickness of the reinforced fiber sheets 71–74 which are utilized to construct U-shaped member 60. In other words, the outer peripheral edge of booster 12 is larger than the thickness of the center section of the U-shaped member 60 which forms part of booster 12.

It will be apparent to those skilled in the art from this disclosure that the high strength fibers used to construct outer strands of fibers 62 can be constructed of a variety of fibers such as carbon fibers, polyamide fibers, glass fibers, reinforced plastic fibers, etc. If carbon fibers are utilized, a very high strength carbon booster can be constructed. However, carbon fibers are more expensive than other types of reinforced plastic fibers, thus, it will be apparent to those skilled in the art that the fibers used for outer strands of fibers 62 can be a composite of carbon fibers and other low cost fibers to reduce the cost of construction of booster 12.

As seen in FIGS. 5, 6 and 13, inner strands of fibers 64 extend about the inner peripheral or circumferential edge of U-shaped member 60 such that the inner strands of fibers 64 have their longitudinal axis running substantially circumferentially about the peripheral or circumferential inner edge of U-shaped member 60. As mentioned above, fibers are very strong in the axial direction but very weak when a force is applied transverse to the axial direction of the fibers. Accordingly, by running the inner strands of fibers along the inner peripheral or circumferential edge of U-shaped member 60, the overall strength of U-shaped member 60 can be increased. Thus, the overall strength of booster 12 is increased by running inner strands of fibers 64 along its inner peripheral or circumferential edge.

In the disclosed embodiment, both outer strands of fibers 62 and inner strands of fibers 64 are formed from sheets of reinforced fibers which are similar to sheets 71–74 discussed above. In other words, a sheet material of reinforced fibers can be cut to the desired shape and length so as to be attached to the peripheral edge of U-shaped member 60 as seen in FIGS. 5, 6 and 13. Preferably, inner strands of fibers 64 extend continuously along the inner peripheral edge of U-shaped member 60 and passed its free ends such that it overlaps the end strands of fibers 66 and 68.

It will be apparent to those skilled in the art from this disclosure that some or all of the inner strands of fibers 64 can overlap the peripheral edge of U-shaped member 60 or all of the strands of fibers 64 can be positioned substantially outside but abutting against the inner peripheral edge of U-shaped member 60. In the preferred embodiment, the U-shaped member 60 abuts the inner strands of fibers 64 and then during the bonding process in which the inner strands of fibers 64 and the reinforced fiber sheets 71–74 are heated and pressed together, the inner strands of fibers 64 and the fibers of reinforced fiber sheets 71–74 tend to slightly overlap.

Preferably, the inner strands of fibers 64 are constructed of circumferential layers of reinforced fiber sheets which extend substantially perpendicular to the reinforced fiber sheets 71–74 as diagrammatically illustrated in FIGS. 5, 6 and 13. In the preferred embodiment, the inner strands of fibers 64 are constructed of twelve circumferential layers of reinforced fiber sheets. As seen in FIG. 13, the reinforced fiber sheets used to construct inner strands of fibers 64 have a width which is greater than the total thickness of the reinforced fiber sheets 71–74 which are utilized to construct U-shaped member 60. In other words, the inner peripheral edge of booster 12 is larger than the thickness of the center section of the U-shaped member 60 which forms part of booster 12.

It will be apparent to those skilled in the art from this disclosure that the high strength fibers used to construct inner strands of fibers 64 can be constructed of a variety of fibers such as carbon fibers, polyamide fibers, glass fibers, reinforced plastic fibers, etc. If carbon fibers are utilized, a very high strength carbon booster can be constructed. However, carbon fibers are more expensive than other types of reinforced plastic fibers, thus, it will be apparent to those skilled in the art that the fibers used for inner strands of fibers 64 can be a composite of carbon fibers and other low cost fibers to reduce the cost of construction of booster 12.

End strands of fibers 66 are wrapped to form mounting hole 56. In particular, end strands of fibers 66 are wrapped to form a looped portion 80 and a pair of end extension portions 82 which overlap with outer and inner strands of fibers 62 and 64. Preferably, end strands of fibers 66 are constructed from a sheet of reinforced fibers which is cut in strips to the proper length and width. Preferably, approximately 20 sheets or strips of reinforced fibers are utilized in forming mounting hole 56.

Likewise, end strands of fibers 68 are wrapped to form mounting hole 58. In particular, end strands of fibers 68 are wrapped to form a looped portion 90 and a pair of end extension portions 92 which overlap with outer and inner strands of fibers 62 and 64. Preferably, end strands of fibers 68 are constructed from a sheet of reinforced fibers which is cut in strips to the proper length and width. Preferably, approximately 20 sheets or strips of reinforced fibers are utilized in forming mounting hole 58.

While only one embodiment of the present invention has been described and illustrated herein, it will be apparent to those skilled in the art once given this disclosure that various modifications, changes, improvements and variations may be made without departing from the spirit or scope of this invention as defined in the following claims.

What is claimed is:

1. A reinforced booster for a bicycle brake, comprising:
   a center section;
   a first leg section integrally formed with said center section and having a free end with a first mounting hole formed therein; and
   a second leg section integrally formed with said center section and extending therefrom to a free end with a second mounting hole formed therein,
   said center section, said first leg section and said second leg section being formed by
      a substantially U-shaped member constructed of at least one reinforced fiber sheet having first and second ends with inner and outer peripheral edges extending therebetween, and
      first strands of fibers coupled to said U-shaped member to extend longitudinally along one of said peripheral edges of said reinforced fiber sheet with said first strands of fibers substantially abutting said one of said peripheral edges of said reinforced fiber sheet.

2. A reinforced booster according to claim 1, wherein said center section, said first leg section and said second leg section are further formed by second strands of fibers coupled to said U-shaped member to extend longitudinally along the other of said peripheral edges of said reinforced fiber sheet with said second strands of fibers substantially abutting said other of said peripheral edges of said reinforced fiber sheet.

3. A reinforced booster according to claim 1, wherein said U-shaped member is constructed of a plurality of layers of reinforced fiber sheets.

4. A reinforced booster according to claim 1, wherein said first leg section is further formed by second strands of fibers coupled to said U-shaped member to define said first mounting hole, and
said second leg section is further formed by third strands of fibers coupled to said U-shaped member to define said second mounting hole.

5. A reinforced booster according to claim 4, wherein said first strands of fibers overlap with said second and third strands of fibers.

6. A reinforced booster according to claim 4, wherein said second strands of fibers are arranged to form a first looped portion defining said first mounting hole and a first extension portion defining part of said first leg section, and said third strands of fibers are arranged to form a second looped portion defining said second mounting hole and a second extension portion defining part of said second leg section.

7. A reinforced booster according to claim 4, wherein
said first and second leg sections are thicker around said first and second mounting holes as defined by said second and third strands of fibers than said U-shaped member.

8. A reinforced booster according to claim 1, wherein
said first strands of fibers overlie one another to form a thickness which is larger than said U-shaped member.

9. A reinforced booster according to claim 1, wherein
said U-shaped member includes a plurality of reinforced fiber sheets which are constructed of substantially uni-directional fibers.

10. A reinforced booster according to claim 9, wherein
said reinforced fiber sheets are arranged such that said fibers of each adjacent said reinforced fiber sheet extends in a different longitudinal direction.

11. A reinforced booster according to claim 2, wherein
said U-shaped member is constructed of a non-metallic material, and said first and second strands of fibers are carbon fibers.

12. A reinforced booster according to claim 1, wherein
said U-shaped member and said first strands are coupled together by an epoxy resin.

13. A reinforced booster according to claim 1, wherein
said center section, said first leg section and said second leg section includes a decorative layer overlying said U-shaped member and said first strands of fibers.

14. A reinforced booster according to claim 2, wherein
said first and second strands of fibers are arranged to form inner and outer peripheral edges, respectively, which are thicker than said U-shaped member extending therebetween.

15. A reinforced booster according to claim 2, wherein
said first leg section is further formed by third strands of fibers coupled to said U-shaped member to define said first mounting hole, and
said second leg section is further formed by fourth strands of fibers coupled to said U-shaped member to define said second mounting hole.

16. A reinforced booster according to claim 2, wherein
said first and second strands of fibers overlap with said third and fourth strands of fibers.

17. A reinforced booster according to claim 2, wherein
said U-shaped member includes a plurality of reinforced fiber sheets which are constructed of substantially uni-directional fibers.

18. A reinforced booster according to claim 17, wherein
said reinforced fiber sheets are arranged such that said fibers of each adjacent said reinforced fiber sheet extends in a different longitudinal direction.

19. A reinforced booster according to claim 17, wherein
said first and second strands of fibers are carbon fibers.

20. A reinforced booster according to claim 2, wherein
said first and second strands of fibers are formed from a plurality of reinforced fiber sheets.

21. A method of producing a reinforced booster for a bicycle, comprising the steps of
layering a plurality of substantially U-shaped reinforced fiber sheets on one another, each of said reinforced fiber sheets having first and second ends with inner and outer peripheral edges extending therebetween;
securing first strands of fibers to one of said peripheral edges of said reinforced fiber sheets to extend longitudinally along said one of said peripheral edges of said sheets such that said one of said peripheral edges of said reinforced fiber sheets substantially abuts said first strands of fibers.

22. A method according to claim 21, wherein
securing second strands of fibers to the other of said peripheral edges of said reinforced fiber sheets to extend longitudinally along said other of said peripheral edges of said reinforced fiber sheets such that the other of said peripheral edges of said reinforced fiber sheets substantially abuts said second strands of fibers.

23. A method according to claim 22 further comprising the steps of
securing third strands of fibers to said first end of said reinforced fiber sheets to define a first mounting hole, and
securing fourth strands of fibers to said second end of said reinforced fiber sheets to define a second mounting hole.

24. A reinforced booster for a bicycle brake, comprising:
a center section;
a first leg section integrally formed with said center section and having a free end with a first mounting hole formed therein; and
a second leg section integrally formed with said center section and extending therefrom to a free end with a second mounting hole formed therein,
said center section, said first leg section and said second leg section being formed by
a substantially U-shaped member having first and second ends with inner and outer peripheral edges extending therebetween, and
first strands of fibers coupled to said U-shaped member to extend longitudinally along one of said peripheral edges of said U-shaped member,
said first leg section including third strands of fibers coupled to said U-shaped member to define said first mounting hole, and said second leg section including fourth strands of fibers coupled to said U-shaped member to define said second mounting hole.

25. A reinforced booster according to claim 24, wherein
said center section, said first leg section and said second leg section are further formed by second strands of fibers coupled to said U-shaped member to extend longitudinally along the other of said peripheral edges of said U-shaped member.

26. A reinforced booster according to claim 25, wherein
said U-shaped member is constructed of a plurality of layers.

27. A method of producing a reinforced booster for a bicycle, comprising the steps of
layering a plurality of substantially U-shaped reinforced fiber sheets on one another, each of said reinforced fiber sheets having first and second ends with inner and outer peripheral edges extending therebetween;
securing first strands of fibers to one of said peripheral edges of said reinforced fiber sheets to extend longitudinally along said one of said peripheral edges of said sheets;
securing third strands of fibers to said first end of said reinforced fiber sheets to define a first mounting hole; and
securing fourth strands of fibers to said second end of said reinforced fiber sheets to define a second mounting hole.

28. A method according to claim 27, wherein securing second strands of fibers to the other of said peripheral edges of said reinforced fiber sheets to extend longitudinally along said other of said peripheral edges of said reinforced fiber sheets.

29. A reinforced booster for a bicycle brake, comprising:

a substantially U-shaped member having a center section, a first leg section extending from said center section to a first free end and a second leg section extending from said center section to a second free end, said U-shaped member having inner and outer U-shaped peripheral edges extending between said first and second free ends;

first strands of fibers coupled to said U-shaped member to extend longitudinally along one of said peripheral edges of said U-shaped member; and first and second mounting holes adjacent formed said first and second free ends of said U-shaped member.

30. A reinforced booster according to claim 29, further comprising second strands of fibers coupled to said U-shaped member to extend longitudinally along the other of said peripheral edges of said U-shaped member.

31. A reinforced booster according to claim 30, wherein said U-shaped member is constructed of a plurality of layers.

32. A reinforced booster according to claim 29, wherein said U-shaped member is constructed of a plurality of layers.

33. A reinforced booster according to claim 30, wherein said first mounting hole is formed by second strands of fibers coupled to said U-shaped member, and said second mounting hole is formed by third strands of fibers coupled to said U-shaped member.

34. A reinforced booster according to claim 33, wherein said first strands of fibers overlap with said second and third strands of fibers.

35. A reinforced booster according to claim 33, wherein said second strands of fibers are arranged to form a first looped portion defining said first mounting hole and a first extension portion defining part of said first leg section, and said third strands of fibers are arranged to form a second looped portion defining said second mounting hole and a second extension portion defining part of said second leg section.

36. A reinforced booster according to claim 30, wherein said U-shaped member includes a plurality of reinforced fiber sheets which are constructed of substantially uni-directional fibers.

37. A reinforced booster according to claim 36, wherein said reinforced fiber sheets are arranged such that said fibers of each adjacent said reinforced fiber sheet extends in a different longitudinal direction.

38. A reinforced booster according to claim 30, wherein said U-shaped member and said first and second strands are coupled together by an epoxy resin.

39. A method of producing a reinforced booster for a bicycle, comprising the steps of layering a plurality of substantially U-shaped reinforced fiber sheets on one another, each of said reinforced fiber sheets having first and second ends with inner and outer peripheral edges extending therebetween; and securing first strands of fibers to one of said peripheral edges of said reinforced fiber sheets to extend longitudinally along said one of said peripheral edges of said sheet.

40. A method according to claim 39, further comprising the step of securing second strands of fibers to the other of said peripheral edges of said reinforced fiber sheets to extend longitudinally along said other of said peripheral edges of said reinforced fiber sheet.

41. A method according to claim 40, further comprising the steps of securing third strands of fibers to said first end of said reinforced fiber sheets to define a first mounting hole, and securing fourth strands of fibers to said second end of said reinforced fiber sheets to define a second mounting hole.

* * * * *